United States Patent

Sutherland

[15] 3,660,907

[45] May 9, 1972

[54] UNDERWATER NAVIGATION INSTRUMENT

[72] Inventor: Lonnie A. Sutherland, 12819 Corpus Christi, Houston, Tex. 77015

[22] Filed: Sept. 3, 1969

[21] Appl. No.: 854,950

[52] U.S. Cl. ..........................................................33/222
[51] Int. Cl. .......................................................G01c 17/14
[58] Field of Search ................33/222 R, 222 A, 222 B, 223, 33/224, 225 R, 72 R

[56] References Cited

UNITED STATES PATENTS

| | | | |
|---|---|---|---|
| 1,474,394 | 11/1923 | Warburg | 33/72 |
| 2,087,086 | 7/1937 | De Beeson | 33/223 X |
| 2,446,568 | 8/1948 | Wolfe | 33/223 X |

FOREIGN PATENTS OR APPLICATIONS

| | | | |
|---|---|---|---|
| 304,765 | 4/1918 | Germany | 33/222 R |
| 940,549 | 3/1956 | Germany | 33/223 |
| 789,942 | 1/1958 | Great Britain | 33/223 |
| 795,255 | 5/1958 | Great Britain | 33/223 |
| 330,803 | 10/1935 | Italy | 33/223 |
| 129,002 | 8/1950 | Sweden | 33/222 R |
| 169,383 | 8/1934 | Switzerland | 33/222 A |

OTHER PUBLICATIONS

" A New Compass" Scientific American, April, 1931, pp. 268 & 270.

*Primary Examiner*—Robert B. Hull
*Attorney*—Pravel, Wilson and Matthews

[57] ABSTRACT

A device adapted to be worn on a diver's wrist for indicating a course underwater comprising a magnetic compass mounted in a case having a side window with means attached to the compass for presenting a visual representation of the actual course on which the diver is heading and a movable reference indicator on the case for presenting a visual indication of the desired course adjacent the window. Such device also includes a rotatable lubbers line movable with the rotatable indicator and extending across the face of the compass for alignment with indicator lines on the face of the compass for presenting a visual course indication on the face of the compass.

1 Claim, 4 Drawing Figures

PATENTED MAY 9 1972

3,660,907

Lonnie A. Sutherland
INVENTOR

BY

Pravel Wilson & Matthews
ATTORNEYS

UNDERWATER NAVIGATION INSTRUMENT

BACKGROUND OF THE INVENTION

1. Field of the Invention

The present invention pertains to compasses for use by scuba divers and the like, and particularly to a compass having means for indicating a predetermined navigational course and means attached to a magnetic compass for comparing the actual course with the desired course to present a visual indication of whether the diver is on a desired course, and if not, the direction and degree to which the course he is following deviates from such predetermined course.

2. Description of the Prior Art

The prior art compasses which have been provided for underwater navigation or use include devices having a movable reference indicator adjacent a compass face which comprises a reference line or lubbers line as it is sometimes called, which may be rotated for alignment with parallel indicator lines on the compass when it is positioned in a north-south orientation to serve as a guide for indicating the direction which a diver is traveling. Because of parallax, devices of this type require observation from directly above the face of the compass for accurate reading, however this view is difficult to maintain while swimming. Furthermore, it will be understood that visibility underwater is, in many instances, limited to a few feet and in some instances, a few inches, and therefore, a diver needs to be able to view his compass almost continually while swimming in order to remain on course.

SUMMARY OF THE INVENTION

The present invention provides a new and improved underwater navigational device comprising a magnetic compass mounted in a case, said compass having a dial face and an annular skirt depending therefrom with indicia of direction inscribed on such annular skirt with a window in the case for viewing the indicia of direction on the skirt to show the diver the direction in which he is actually traveling and means rotatably mounted on said case for presenting a visual indication of the desired direction of travel adjacent to the viewing window so that the actual direction and desired direction may be instantly compared.

It is also an object of the present invention to provide a new and improved underwater compass having an index rotatably mounted thereon for indicating the desired direction of travel in terms of degrees about a compass in reverse or counter-clockwise direction so as to present a reading of such desired direction at the front or near side of a compass. Such device also includes an index extending circumferentially of a compass with the points on the compass indicated thereon in counter-clockwise direction so as to present a visual indication of the actual course or bearing adjacent a corresponding indication of the desired course on which a diver is traveling.

A further object of the present invention is to provide a new and improved underwater navigational device which can be worn on a diver's wrist and viewed more or less continuously by the diver whiel he is in a prone position with his forearm in front of his face, without interferring with his swimming and which will also give an indication of the elevational attitude of the diver in the water, that is, whether he is disposed in a horizontal plane or is heading downwardly or upwardly. The present invention also includes a rotatable lubbers line connected to the rotatable index and adapted to be aligned with a pair of parallel north-south orientated lines on the disc compass to present visual indication of a predetermined course that is viewable from above the face of the compass as well as from the side of the compass.

DESCRIPTION OF THE PREFERRED EMBODIMENT

Figure 1:
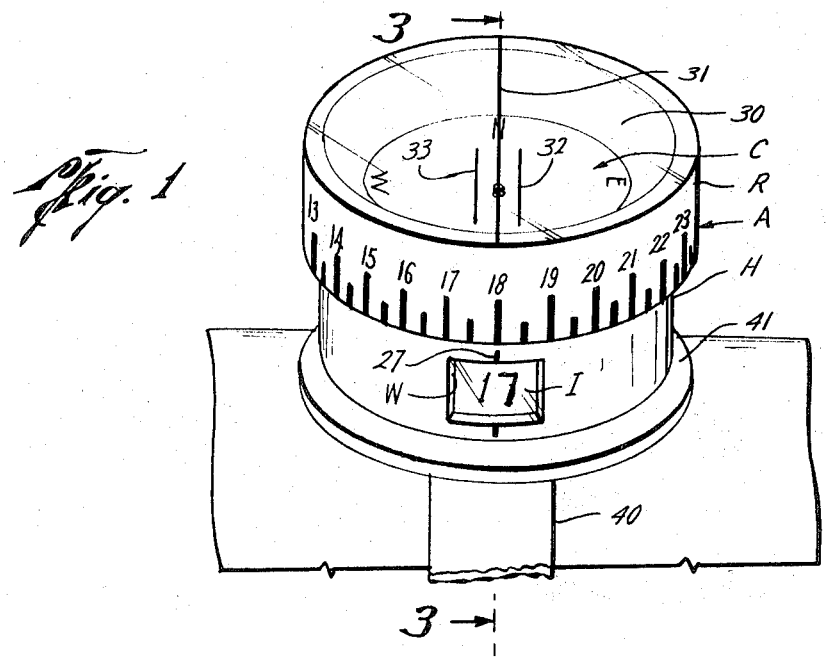
FIG. 1 is an isometric view of the underwater navigation instruments of the present invention shown strapped onto a diver's wrist.
Figure 4:
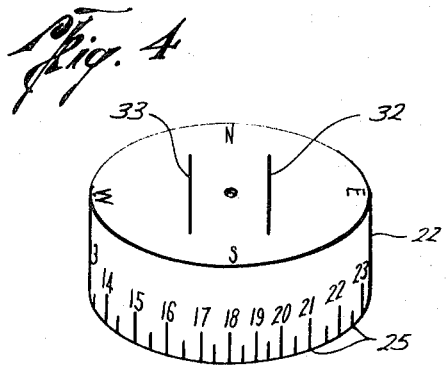
FIG. 3 is a sectional view taken on line 3—3 of FIG. 1 showing additional details of construction of such apparatus and FIG. 4 is an isometric view of the direction indicator in the navigation instrument.

The navigation device of the present invention is designated generally A in the drawings. Such device comprises a magnetic compass C mounted in a sealed housing H which is preferably filled with water or some other suitable incompressible fluid. Such housing H is provided with a window W for viewing a numerical direction indicator I attached to such compass C. A direction reference indicator R is rotatably mounted on the housing H to enable a visual indication of a desired course or bearing to be presented adjacent a visual indication of the actual course displayed adjacent the window W in the apparatus of the present invention to enable a diver to set a desired course on the reference indicator R and by comparing the actual course indicated by the compass indicator I, determine whether he is following the desired course, or whether he is deviating from such desired course, and, if so, in what direction and to what extent.

Figure 3:
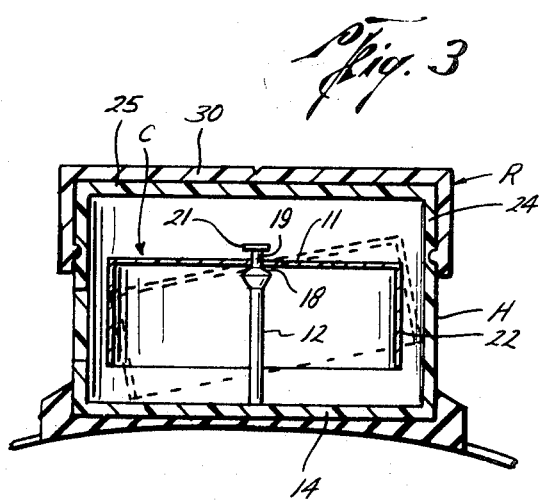
Figure 2:
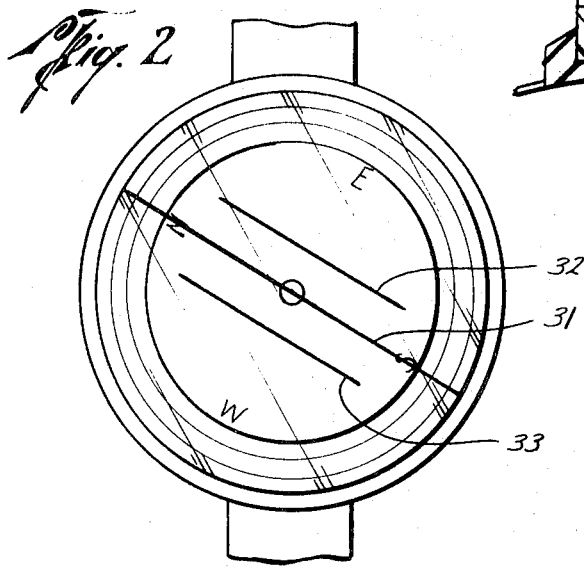
FIG. 2 is a plane view of the navigation instrument of the present invention.

Considering now the apparatus of the present invention in more detail, the compass C includes a magnetized disc 11 having a magnetic northpole N and a magnetic southpole S. Such disc 11 is rotatably mounted on a pin 12 that is secured in the bottom 14 of the housing H. Such pin 12 has an inclined annular shoulder 18 adjacent its upper end with a small diameter shaft 19 projecting thereabove which extends through an opening 20 in the center of the disc 11. A cap 21 is provided at the upper end of the shaft 19 for holding the disc in place thereon and the inclined annular shoulder 18 permits the disc 11 to tilt out of the horizontal plane and rotate about the shaft 19 as is shown in phantom in FIG. 3 of the drawing.

An annular skirt 22 is affixed to the outer edge of the disc 11 and depends therefrom. Such skirt 22 has the degrees or points of the compass inscribed thereon in reverse order, that is, reading in a counter-clockwise direction. Such degrees read from zero to 360° in 30° increments, i.e., with numbers at each 10°. Intermediate marks 25 are disposed between the numbered marks to indicate additional five degree increments or divisions between the numbered degree marks. Thus, there will normally be numbers indicating the degree marks for "30°", "35°", "40°", "45°", etc., about the compass C, with intermediate marks or bars 25 indicating 5° increments between each numbered mark.

The housing H comprises a cylindrical body 24 having a circular top 25 in addition to the circular bottom 14. Such top and bottom members are glued or otherwise secured to the cylindrical body 24 at or near its opposite edges so as to provide a closed case for housing the compass C. Such case is completely filled with water or other suitable incompressible fluid so as to compensate for increased pressures encountered at subsurface depths. The window W is normally a square or rectangular clear aperture formed in the side of the cylindrical body 24 adjacent to or facing the diver when the apparatus A is strapped on his wrist as shown in FIG. 1. Indicator marks 27 extend above and below the window W along the midline thereof to provide a reference line for reading the precise degrees on the annular skirt 22 and also to provide a sighting means for assisting the diver in determining the course which leads him to his objective which will be described in detail hereinafter.

A reference ring or sleeve R extends circumferentially of such cylindrical housing 24 and is rotatably mounted thereon. The reference ring R is preferably formed of transparent plastic or other suitable transparent material and has indicia of the degrees or points on the compass arranged in counter-clockwise order from zero to 360° in numbered 10° increments corresponding to the degree marks appearing on the annular skirt 22 and with unnumbered marks representing 5° increments between the numbered marks.

As best seen in FIG. 1 of the drawings, the ring R is positioned above and adjacent to the window W through which the numerals of the annular skirt 22 may be viewed.

A circular transparent top 30 is provided on the cylindrical ring R which may either be secured adjacent its upper edge or formed integrally therewith. A line 31 extends diametrically of such top 30 from the zero degree mark to the 180° mark as shown. A pair of laterally spaced parallel indicator lines 32 and 33 are parallel to a line which extends from the south pole S to the north pole N on the magnetized disc 11. When the numbered degree marks on the annular skirt are aligned radially with the corresponding numbered degree marks on the circumferentially extending ring R, the lines 32 and 33 will be parallel to the line 31 and disposed on the opposite sides thereof.

In using the navigation apparatus A of the present invention, the diver straps such apparatus on to his wrist by means of a strap 40 which is preferably formed integrally with a moulded receptacle 41 which receives the base portion of the housing H. Such apparatus is aligned with the window W facing the diver when he positions his forearm in front of his face. In aligning the compass C so as to determine his course the diver holds the apparatus A in front of him and allows the compass disc 11 to align itself in a north-south orientation. With the compass held steady in this position the indicator ring R is rotated until the numerical indicia on such ring corresponds with the number or other mark 25 appearing in the window W and the two parallel lines 32 and 33 are arranged parallel to the line 31 on the top of the ring R. With the indicator ring thus aligned with the compass disc 22, the diver may then sight across the face of the compass to a distant object which is his target or destination and align the numbers or marks on the ring R with respect to the corresponding number on the indicator skirt 22. It will be appreciated that such lines 27 as well as the other marks and numbers or letters inscribed on the disc 11, the annular skirt 22 or the ring R are normally luminescent or they are coated with radioactive material or otherwise caused to glow in the dark. Thus, by holding the compass C at eye level and aligning the upper end of the line 27 with the distant target, the diver may obtain an accurate reading of the direction to his distant target which will constitute his projected course. Also, it will be appreciated that when the numerical indicia on the ring R aligns so as to correspond with the numerical indicia appearing in the window W the parallel lines 32 and 33 will be parallel to and on opposite sides of the indicator line 31 on the top of the ring R and, if necessary, the diver may view the navigation apparatus A from above while swimming toward his target and by keeping the two lines 32 and 33 parallel to and on opposite sides of such line 31, follow a course toward his target.

However, it will be appreciated that in swimming toward his target along his projected course, it is preferred that the diver hold the navigation apparatus A in front of his face and view the window W as he swims along with his forearm positioned in front of him. As long as the number appearing in the window W corresponds to the number on the ring R which was positioned and adjacent to such window W in aligning up his course, the diver will remain on course toward his destination. By observing the numbers on the annular skirt 22 that are viewed through the window W, the diver may also tell whether he is deviating from his projected course, the direction of deviation, and the number of degrees of deviation so that he may correct the direction in which he is swimming to bring him back on his original course.

Once the diver has reached his original destination and wishes to return, he may then swim in such a direction that the number appearing in the window on the annular skirt 22 will be the reciprocal bearing of the number he originally set on the indicator ring R adjacent to such window W. Also, with the apparatus of the present invention, the diver may determine whether he is swimming in a horizontal plane or if he is swimming in a downward or upward direction according to the tilt of the disc 11 in the annular skirt 22. By viewing such skirt 22 through the window W, the diver can determine his attitude in the water by the degree of tilt of the disc 11.

The foregoing disclosure and description of the invention are illustrative and explanatory thereof, and various changes in the size, shape, and materials as well as in the details of the illustrated construction may be made without departing from the spirit of the invention.

What is claimed is:

1. An underwater navigation instrument for use by a diver in navigation underwater comprising:
   a. a housing adapted to be strapped on a diver's wrist;
   b. a magnetic compass rotatably mounted in said housing, said compass including:
      1. a magnetized disc having a north pole and a south pole,
      2. an annular skirt depending from the periphery of said disc, and
      3. a plurality of indicia of points about a compass inscribed on said annular skirt;
   c. a window in said housing for viewing said annular skirt;
   d. an indicator ring extending circumferentially of said housing and rotatably mounted thereon and comprising a cylindrical portion having a plurality of indicia of points about a compass inscribed thereon for alignment adjacent said window and a circular top on said indicator ring having a lubber line extending diametrically thereacross for alignment with the north and south poles of said magnetized disc.

* * * * *